United States Patent Office
3,455,718
Patented July 15, 1969

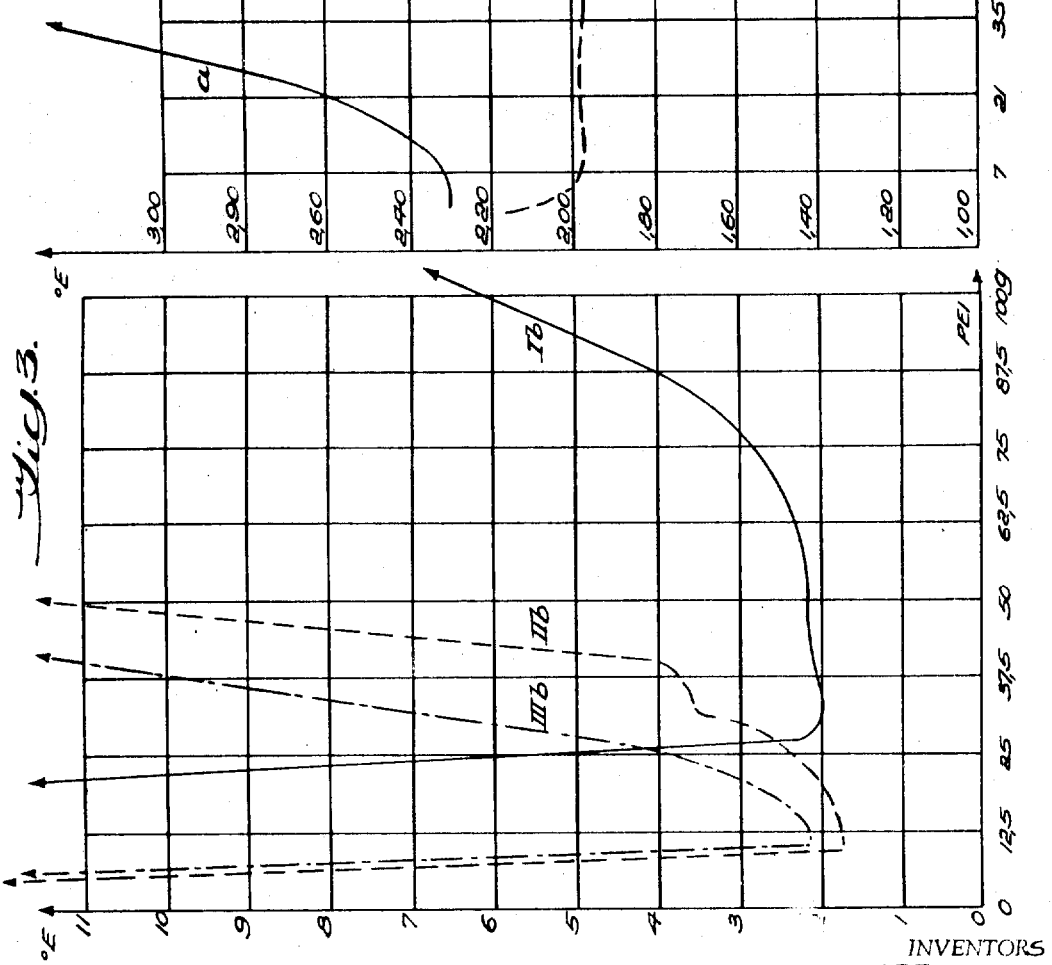

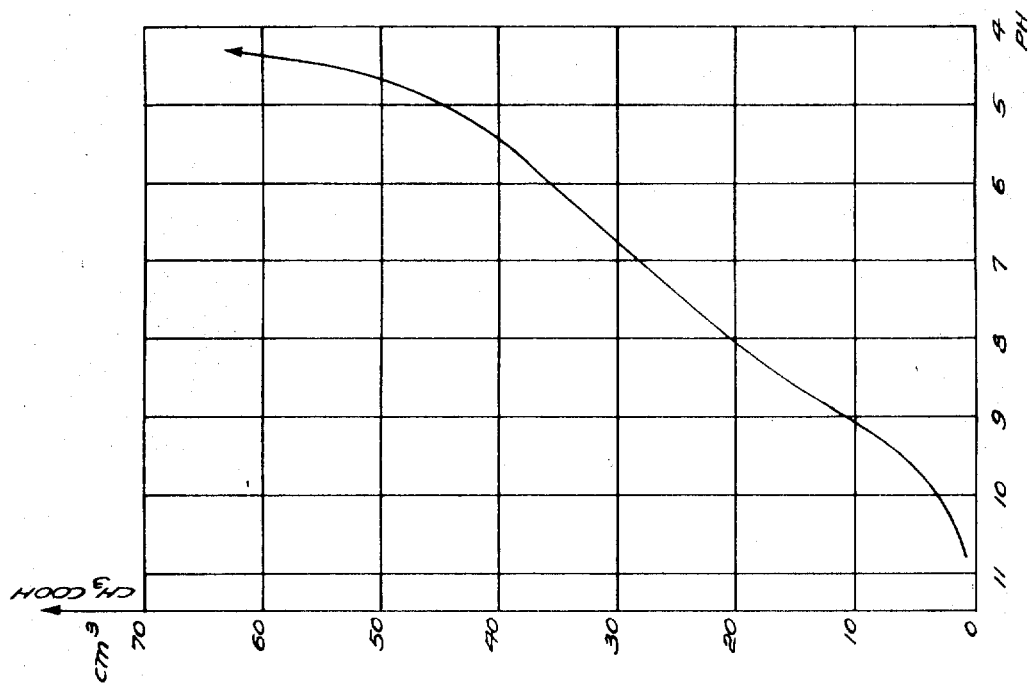

3,455,718
COLLOIDAL SOLUTIONS OF EXTREMELY FINELY DIVIDED OXIDES WHICH ARE STABLE ON STORAGE AND PROCESS FOR THE PRODUCTION THEREOF
Karl Dithmar and Peter Koblischek, Frankfurt am Main, Germany, assignors to Deutsche Gold- und Silber-Scheideanstalt vormals Roessler, Frankfurt am Main, Germany
Filed Sept. 23, 1965, Ser. No. 489,571
Claims priority, application Germany, Sept. 24, 1964,
D 45,495
Int. Cl. C09k 3/30; C09c 1/40, 1/28
U.S. Cl. 106—287
6 Claims

ABSTRACT OF THE DISCLOSURE

Process for the production of a colloidal solution of extremely finely divided oxide aerogel selected from the group consisting of pyrogenic aerogels of silica and pyrogenic mixed aerogels of silica and aluminum oxide which comprises providing an aqueous solution of polyethylene imine, at least a portion of which is in the form of an acid addition salt thereof, and dispersing the finely divided oxide aerogel in dry form in said aqueous solution, the quantity of the polyethylene imine contained in said aqueous solution which represents the sum of the free and the acid bound base being such as to provide a colloidal solution which has a viscosity which is about the minimum viscosity for colloidal solutions containing the oxide aerogel and the polyethylene imine.

---

Figure 2:
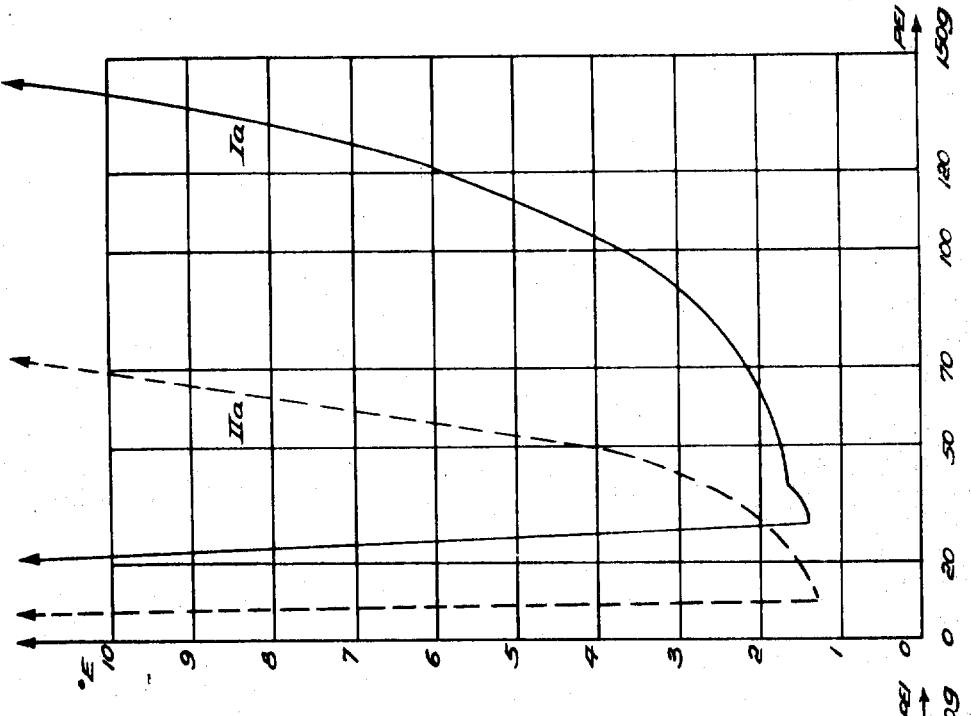

The present invention relates to a process for the production of colloidal solutions of extremely finely divided oxides and/or mixed oxides, especially of pyrogenic silica or mixed oxides containing pyrogenic silica which are stable on storage and which are capable of use over a wide pH range for the improvement of the surface characteristics of films and fibers.

It is known that colloidal solutions can be prepared from extremely finely divided oxides, such as silicon dioxide, titanium oxide, aluminum oxide, zirconium oxide and the like produced by the thermal decomposition of metal or metalloid compounds in the gas phase under hydrolysing conditions. It is also known that dispersions can be prepared from mixed oxides of the above mentioned oxides. Through further work on precipitation reactions it was recognized that, for example, an $SiO_2$ colloid prepared on the above basis is electronegatively charged and that conversely the aluminum oxide colloid is positively charged so that upon mixture with other colloids they behave differently in that, as is known, precipitation does or does not occur, depending upon the charge of the added colloid. For example, such $SiO_2$ colloids are normally precipitated by electropositively charged colloids.

It is already known that small quantities of finely divided silica can be employed together with relatively large quantities of polyethylene imine (hereinafter designated as PEI for sake of brevity) in textile processing baths for purposes of reducing fiber slippage. In such instances precipitation is said to be prevented. According to this process only 0.7 to 1.4 parts by weight of finely divided silica or other hydroxyl group containing inorganic fillers are employed per 25 parts by weight of 50% PEI. According to such known method it has not been possible to maintain larger quantities of silica in solution together with the PEI without occurrence of precipitation. This is already the case when the $SiO_2$ content is increased to 2.8 to 3.5 parts by weight in conjunction with the above-mentioned quantity of PEI (25 parts by weight of 50% PEI). Therefore according to such method colloids can only be obtained which contain a quantity of $SiO_2$ is only ¼ of that by weight of the PEI as with larger proportions of $SiO_2$ precipitation occurs.

According to another proposal it was found that in the common use of PEI and $SiO_2$ colloids or dispersions of other finely divided oxides produced from oxide aerogels in a single treating bath, the precipitation of the electronegatively charged $SiO_2$ colloid could be avoided by PEI if such baths were prepared in a special manner, namely, by intensive dispersion of the $SiO_2$ aerogel in dry form in an aqueous solution of PEI rather than by addition of the $SiO_2$ aerogel in the form of a previously prepared aqueous dispersion to the PEI solution. While such proposal is of considerable value for the processing of regenerated cellulose films which in many instances require that PEI and a large quantity of finely divided silica must be applied to the surface of such films, such proposal still has its limitations with regard to its conditions of use and the concentrations of the PEI and silica. It furthermore has been found that depending upon the method employed for the production of the oxide aerogel employed for the production of the colloidal solution large variations occur in the quantity of PEI required to prevent precipitation upon addition of electropositive colloids. It was found that this is caused by the large variations in the BET surface area in aerogels produced under different conditions which can be ascertained in the known manner by nitrogen adsorption at the temperature of liquid nitrogen. Such surface area in oxide aerogels suitable for the production of colloidal solutions can vary between 20 and several 100 square meters per gram (m.$^2$/g.). It furthermore was found that a second cause for instability of the colloidal solutions is the high alkalinity of the free base of PEI which is over 10.7.

The object of the invention is to provide a process for the production of colloidal solutions of finely divided oxides and especially of pyrogenic silica aerogels or mixed oxide aerogels containing pyrogenic silica which are stable during storage and which can be used over a wide pH range in the surface treatment of films and textile fibers without precipitation or thickening.

According to the invention it was found that this object is achieved in that the colloidal solutions are prepared with the aid of PEI either partially or completely in the form of an acid addition salt thereof and that the quantity of PEI, which is the sum of the free base and the acid bound base, is so selected that the viscosity of the colloidal solution is at or substantially at its minimum, such quantity being calculatable from the BET surface area of the oxide aerogel employed in the colloidal solution. If desired, other known additions can be incorporated in such colloidal solutions.

Figure 1:
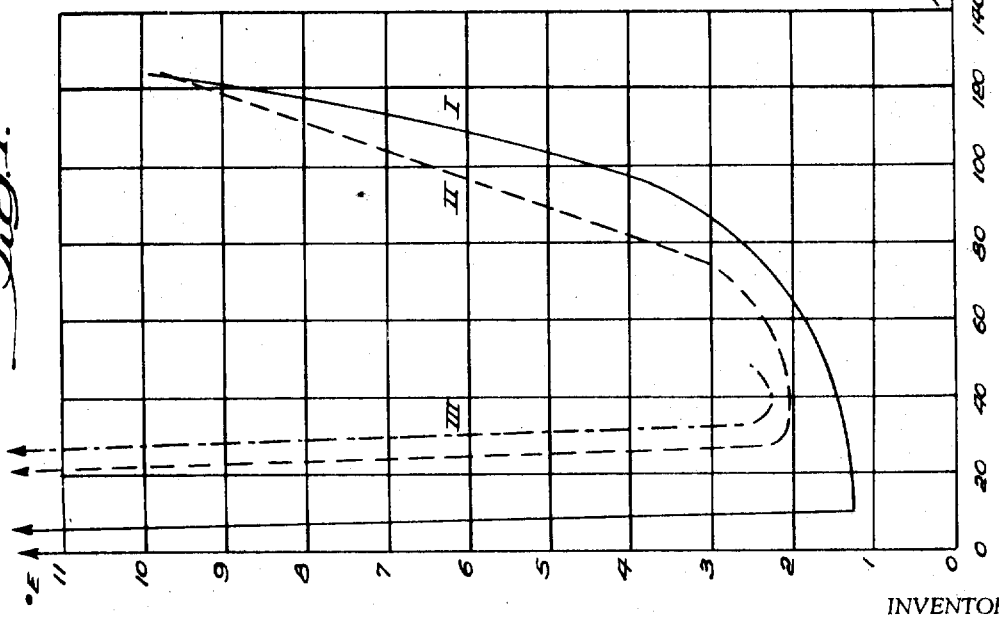

In the accompanying drawings:
FIG. 1 graphically illustrates the changes in viscosity in colloidal oxide aerogel solutions with varying quantities of PEI as free base in a series of tests employing oxide aerogels of different BET surface areas;
FIG. 2 graphically illustrates the changes in viscosity in a series of tests with colloidal oxide aerogel solutions of the same colloidal oxide with varying quantities of PEI as free base and of PEI partially converted to the acetate salt;
FIG. 3 graphically illustrates the changes in viscosity in a series of tests with colloidal oxide aerogel solutions of the same colloidal oxide with varying quantities of PEI as free base, of PEI partially converted to the acetate salt and of PEI completely converted to the acetate salt;
FIG. 4 graphically illustrates the viscosity patterns of colloidal oxide aerogel solutions with PEI as free base and with PEI partially converted to acetate salt; and FIG. 5 graphically illustrates the pH values achieved with various additions of acetic acid to PEI.

The process according to the invention renders it possible to prevent flocculation or precipitation engendered by BET variations and too high an alkalinity and in addition the protective action of the PEI against the flocculating action of electropositive colloids is increased by acid addition salts of PEI and the special quantities of PEI, as free base and as acid addition salt, employed. The acid addition salts of PEI have not been used previously in the preparation of colloidal solutions of oxide aerogels, even though, as has now been ascertained, they are more effective than the base itself. As with higher concentrations of the base the optimum stability is not achieved, as the colloidal solutions tend to thicken on storage, the use of acid addition salts of the base is more advantageous than the use of the free base alone.

In the investigations which led to the present invention it was found that very generally the precipitatability of the normally negatively charged $SiO_2$ colloids which are produced by the thermal hydrolytic decomposition of volatile silica compounds in the vapor phase, by electropositively charged colloids is hindered when the oxide aerogel is dispersed in aqueous solutions of certain quantities of PEI salt and base mixtures, which are dependent upon the BET surface area of the oxide aerogel, with the aid of a high speed turbo stirrer. Not only were the proportions of the PEI and $SiO_2$ found to be critical for the stability of the colloid but also that the BET surface area in m.$^2$/g. of the particular oxide or mixed oxide aerogel employed determines the quantity of PEI salt and base mixture required to achieve optimum stability on storage. In other words, the critical proportions when using an oxide aerogel of one BET surface area will differ when using an oxide aerogel with a different BET surface area.

The process according to the invention is characterized by a rule which is dependent upon two variables.

(A) For a colloidal solution containing 200 g. per liter of oxide aerogel, 0.5 g. of PEI are required per square meter of BET surface area per gram of such oxide aerogel to provide optimal stability. For example, with an oxide aerogel having a BET surface area of 150 m.$^2$/g. three times as much PEI are required than with an oxide aerogel having a BET surface area of 50 m.$^2$/g., when the same quantity of oxide aerogel is concerned, in order to provide the optimum stability on storage and lowest tendency to precipitate. Therefore with colloidal solutions containing 200 g. of the oxide aerogel per liter 75 g. and 25 g. of PEI would respectively be required for the aerogels mentioned.

(B) When PEI is employed which has been substantially or completely converted into its acid addition salt, for example, its acetic acid addition salt, only ⅓ of the quantity of PEI (calculated as such) is required to achieve the same result as with the free base for an oxide of the same BET surface area. This is illustrated by the following.

The rule upon which the process according to the invention is based was found valid for the oxide aerogels of practical importance having BET surface areas between 30 and 150 m.$^2$/g. It is valid not only for pure $SiO_2$ aerogels but also mixed oxide aerogels of $SiO_2+Al_2O_3$ (for example, 99% $SiO_2+1\%$ $Al_2O_3$) and can analogously be applied to other oxide aerogels taking into consideration the molecular weight and the surface area. The rule is also valid, to a far degree, independent of the special thermal conditions under which, for example, the $SiCl_4$ is decomposed. As shown in the examples below, oxide aerogels produced in atmospheres of $H_2:N_2:O_2$ of various composition and also of $H_2:$air conformed to the rule given above.

The quantity of PEI provided by the rule gives colloidal solutions prepared by dispersing the oxide aerogel with the aid of a turbo stirrer having a minimum viscosity. Larger or smaller doses give colloidal solutions having higher viscosities as can be seen from the curves in FIGS. 1–3. The quantity of PEI which gives colloidal solutions of minimum viscosity also provides for the greatest stability of such colloidal solution.

The rule given under A that, with a colloidal solution containing 200 g. of $SiO_2$ per liter, one-half of the number of square meters of BET surface area of the $SiO_2$ in question gives the amount of PEI in grams per liter providing the minimum viscosity in such solution applies in the alkaline region (pH of 10.7–11) that is in the extreme case when the PEI is present in the form of the free base (FIG. 1). This region which approximates soda alkalinity does not provide the best stability on storage. As shown in FIG. 4 a large increase in viscosity, depending on storage time, takes place.

If, on the other hand, the PEI salts, such as, PEI acetate or formate are employed as under B, an increase in viscosity upon storage is avoided and the amount of PEI required to give the minimum viscosity is substantially decreased. Its value amounts in grams calculated as free PEI to only ⅙ of the value of the surface area of the $SiO_2$ in meters in a colloidal solution containing 200 g./l. of $SiO_2$ or in other words only ⅓ of the quantity which is required when employed as the free base. This at the same time renders it possible to widen the use of the dispersions over the entire pH scale.

Although it is already known that certain organic bases are adsorbed according to the surface area of the oxide particles it is most surprising that the amount of PEI base required to produce the minimum viscosity is reduced to such a great extent by reduction of the surface area of the oxide. The viscosity minimum is not only to a great extent dependent upon the BET surface area of the oxide but it furthermore is most surprising that the quantity of PEI when it is present in salt form can be reduced still further. The acetic acid salt, for instance, has 3 times the effect of the free base and the same results are obtained with only ⅓ the quantity as shown in FIG. 3.

In the above only the extreme cases of the salt and the free base have been considered. With mixtures of PEI base with PEI salts intermediate values for the quantities of PEI to be employed are obtained. The colloidal solutions which have the minimum viscosity are most stable when 5 to 85% and preferably 10 to 75% of the base has been converted to the salt. The three-fold reduction in the quantity of PEI required when using PEI completely in the form of its acetate salt instead of as the free base is already achieved, for example, when only 68% of the PEI is in the form of the salt.

The use of the PEI salts broadens the possibility of use of the colloidal oxide solutions from the previously available alkaline region of a pH of around 10 and above down through the neutral point and through the preferred weakly acid field to a pH of 3.5. The middle pH ranges are obtained by suitable mixtures of PEI base and PEI salt.

The possibility of using the colloidal solutions over practically the entire pH scale range was not possible with the previously prepared colloidal solutions. As can, for example, be seen from FIG. 3, 45 g./l. of PEI base are required to produce the viscosity minimum in a colloidal solution containing 200 g./l. $SiO_2$ with a BET surface area of 64 m.$^2$/g. On the other hand, this quantity of PEI at a pH of 5.5 would cause an excessive increase in viscosity with ultimate flocculation.

The numerical rule has for sake of simplicity been given for a 20% (200 g./l.) colloidal solution of $SiO_2$ but it also applies for other $SiO_2$ concentrations proportional to the absolute quantity of $SiO_2$. The proper quantity of PEI for any particular oxide concentration with regard to variables which as already indicated in g./l. amounts to 0.5 times the BET surface area of the oxide aerogel measured in m.²/g. for a 20% SiO₂ solution can easily be interpolated, for instance, a 15% colloidal SiO₂ solution would require only 75% of the quantity of PEI required for a 20% solution. It was, for example, found that 20 g. and 27.5 g. of PEI per liter were required to provide the minimum viscosity in colloidal solutions containing 15% and 20% respectively of SiO₂ with a BET surface area of 53 m.²/g. It will be seen that the ratio of the SiO₂ and PEI concentrations remain essentially the same. However, of course, the actual ratio must be varied with oxides with different BET surface areas and with variations in the PEI base to salt ratios. The latter variables can cause very substantial changes in the quantity of PEI required to give the viscosity minimum. For example, a colloidal solution of a SiO₂ aerogel of a BET surface area of 120 at a pH of 10, with PEI present in the form of the free base, therefore will require 9 times the quantity of PEI as is required in a colloidal solution of a SiO₂ aerogel of a BET surface area of 40 with the PEI present in the form of its salt. As shown in FIG. 5, 60 ml. of glacial acetic acid are required for the complete conversion of 50 g. of PEI base tot he acetic acid salt; 45 ml. for a 75% conversion and 3 ml. for a 5% conversion.

The quantity (Y) of PEI representing the sum of the free and acid bound base in grams per liter of colloidal solution required to give a colloidal solution having a minimum viscosity in general can be calculated from the following equation:

$$Y = \text{less than } \tfrac{1}{2} \text{ to } \tfrac{1}{6} \text{ times } X/200 \text{ times } Z$$

where X represents the quantity of oxide aerogel in the colloidal solution in grams per liter and Z is the BET surface area of the oxide aerogel in square meters per gram, the quantity within the range given being the less the greater the proportion of PEI salt to PEI base.

The colloidal solutions produced according to the invention from extremely finely divided oxide or mixed oxide aerogels with the aid of PEI are not precipitated by the addition of electropositive colloids. They also are stable against non-ionic textile assistants. In general, the colloidal solutions according to the invention can be used in admixture with other textile assistants in all such instances where electropositive colloid charges are provided by the other components of the mixture. For example, cation-active softeners (electropositive) are as a rule used in combination with resins, for example, based on urea formaldehyde, melamine formaldehyde, triazone resins and epoxy resins in the production of wash and wear finishes and also in the production of so-called resin free finishes. The colloidal solutions according to the invention in these instances act as textile finishing agents which improve the resistance to tear, the abrasion resistance and the resistance to fiber displacement of the textiles.

Polyethylene imine as is known can be obtained by catalytic acid (cationic) polymerization of ethylene imine. The polyethylene imine employed herein was obtained by a catalytic acid polymerization of ethylene imine which was terminated by neutralization. The 50% aqueous paste employed as starting material was of the free base and of the pH of about 10.7 as already indicated. Such water soluble polyethylene imine product has already achieved wide use in the paper industry to increaset he wet strength of paper and is, for example, available as the well-known product Polymin-P.

The following examples will serve to illustrate the present invention:

EXAMPLE 1

The dependency of the amount of PEI required to provide colloidal solutions of minimum viscosity on the BET surface area of the oxide aerogel concerned was investigated in 3 comparative viscosity series I, II and III, in each instance using the identical oxide aerogel concentration, namely, 200 g. of a mixed oxide aerogel of 99% SiO₂ and 1% Al₂O₃ produced by the pyrolytic vapor phase decomposition of volatile silicon and aluminum compounds in the presence of hydrolysing agents.

In each test the quantity of PEI in question in the form of a 50% aqueous paste was mixed with 600–800 ml. of distilled water and 200 g. of the mixed oxide concerned mixed therewith with the aid of a propellor stirrer and water added to provide a 1000 ml. volume. Thereafter thorough dispersion was effected with a turbo stirrer ("Ultra-Turrax," laboratory type, Jahnke & Kunkel) for 30 minutes while cooling. The viscosity was determined at 20° C. with a 50 ml. pipette in comparison with the time required for distilled water to run out of the pipette and is given in ° Engler. The results are tabulated below:

Series I.—Mixed oxide I with a BET surface area of 27 m.²/g.

| 200 g. mixed oxide I +: | Viscosity ° E. |
|---|---|
| 5.0 g. PEI | Solid |
| 10.0 g. PEI | 1.27 |
| 12.5 g. PEI | 1.21 |
| 15.0 g. PEI | 1.22 |
| 20.0 g. PEI | 1.24 |
| 30.0 g. PEI | 1.33 |
| 40.0 g. PEI | 1.40 |
| 50.0 g. PEI | 1.67 |
| 75.0 g. PEI | 2.28 |
| 100.0 g. PEI | 4.42 |
| 125.0 g. PEI | 9.78 |
| 150.0 g. PEI | Solid |

Viscosity minimum at 12.5 g./l. PEI

Series II.—Mixed oxide II with a BET surface area of 64 m.²/g.

| 200 g. mixed oxide II +: | Viscosity ° E. |
|---|---|
| 20.0 g. PEI | Highly viscous |
| 27.5 g. PEI | 2.32 |
| 32.5 g. PEI | 1.93 |
| 40.0 g. PEI | 2.03 |
| 50.0 g. PEI | 2.14 |
| 75.0 g. PEI | 2.86 |
| 100.0 g. PEI | 6.24 |
| 125.0 g. PEI | 9.62 |
| 150.0 g. PEI | Highly viscous |

Viscosity minimum at 32.5 g./l. PEI

Series III.—Mixed oxide III with a BET surface area of 73 m.²/g.

| 200 g. mixed oxide III +: | Viscosity ° E. |
|---|---|
| 32.5 g. PEI | 2.72 |
| 40.0 g. PEI | 2.22 |
| 47.5 g. PEI | 2.47 |

Viscosity minimum at 40.0 g./l. PEI

FIG. 1 graphically illustrates the results of these series of tests, the quantity of PEI in g. being given on the abscissa and the Engler viscosity in ° E being given on the ordinate.

EXAMPLE 2

As was already indicated above, the quantity of PEI required for obtaining colloidal solutions of the minimum viscosity is to a great extent independent of the method of production and type of the oxide aerogel concerned (provided, of course, that the BET surface area thereof is taken into consideration under the rule according to the invention). This is illustrated in the first series of tests tabulated below.

In series Ia PEI was employed in the form of a free base and in series IIa the PEI was employed in the form of a mixture, namely 68% in the form of the acetic acid salt and 32% in the form of the free base. This mixture was prepared by employing 90 parts by weight of 99–100% acetic acid per 100 parts by weight of PEI.

The tests were carried out analogously to those of Example 1, however, using 150 g./l. of pyrogenic pure SiO₂ aerogel produced with an oxygen-hydrogen-nitrogen mixture with a BET surface area of 84 m²/g. in each test.

Series Ia.—PEI free base 150 g. SiO₂ BET surface area
84 m.²/g. +:             Viscosity ° E.
  5 g. PEI _____ Solid
 10 g. PEI _____ Solid
 20 g. PEI _____ Highly viscous
 30 g. PEI _____ 1.39
 40 g. PEI _____ 1.63
 50 g. PEI _____ 1.73
 75 g. PEI _____ 2.21
100 g. PEI _____ 3.65
150 g. PEI _____ Highly viscous Viscosity minimum at 30 g./l. PEI The 30 g./l. of PEI for a colloidal solution of 150 g./l. of SiO₂ corresponds to 40 g./l. of PEI for a colloidal solution of 200 g./l. of SiO₂. The value 40 again is approximately ½ of the value of the BET surface area in m.².

Series IIa.—PEI 68% in the form of PEI acetate and 32% in the form of the free base 150 g. SiO₂ BET surface area
84 m.²/g. +:             Viscosity ° E.
  5 g. PEI _____ Highly viscous
 10 g. PEI _____ 1.23
 20 g. PEI _____ 1.51
 30 g. PEI _____ 2.03
 40 g. PEI _____ 2.50
 50 g. PEI _____ 4.12
 75 g. PEI _____ 11.78
100 g. PEI _____ Highly viscous
150 g. PEI _____ Solid Viscosity minimum at 10 g./l. PEI or only ⅓ the quantity required with PEI in the form of the free base FIG. 2 graphically illustrates the results of these tests (series Ia and IIa).

EXAMPLE 3

Analogously to Examples 1 and 2, three series of tests, series Ib, IIb and IIIb, were carried out employing a mixed oxide of 99% of SnO₂ and 1% Al₂O₃ with a BET surface area of 64 m.²/g. at a concentration of 200 g./l. In series Ib the PEI was employed in the form of the free base, in series IIb the PEI was 68% in the form of its acetate and 32% in the form of the free base and in series IIIb the PEI was completely in the form of the acetate (this required 132 ml. of 99–100% acetic acid per 100 g. of PEI).

Series Ib.—PEI in the form of the free base 200 g. of mixed oxide, BET surface
area 64 m.²/g. +:           Viscosity ° E.
  5.0 g. PEI _____ Solid
 10.0 g. PEI _____ Solid
 15.0 g. PEI _____ Solid
 20.0 g. PEI _____ Highly viscous
 27.5 g. PEI _____ 2.32
 32.5 g. PEI _____ 1.93
 40.0 g. PEI _____ 2.03
 50.0 g. PEI _____ 2.14
 75.0 g. PEI _____ 2.86
100.0 g. PEI _____ 6.24
125.0 g. PEI _____ 9.62
150.0 g. PEI _____ Highly viscous Viscosity minimum at 32.5 g./l. PEI Series IIb.—PEI, 68% in the form of PEI acetate and 32% in the form of the free base 200 g. of mixed oxide, BET surface
area 64 m.²/g. +:           Viscosity ° E.
  5.0 g. PEI _____ Solid
 10.0 g. PEI _____ 1.76
 15.0 g. PEI _____ 1.77
 20.0 g. PEI _____ 1.91
 27.5 g. PEI _____ 2.62
 32.5 g. PEI _____ 3.62
 40.0 g. PEI _____ 4.00
 50.0 g. PEI _____ 11.20
 75.0 g. PEI _____ Viscous
100.0 g. PEI _____ Highly viscous
125.0 g. PEI _____ Solid
150.0 g. PEI _____ Solid Viscosity minimum at 10 g./l. PEI Series IIIb.—PEI in the form of its acetic acid salt only 200 g. of mixed oxide, BET surface
area 64 m.²/g. +:           Viscosity ° E.
  5.0 g. PEI _____ Solid
 10.0 g. PEI _____ 2.19
 15.0 g. PEI _____ 2.25
 20.0 g. PEI _____ 2.66
 27.5 g. PEI _____ 4.44
 32.5 g. PEI _____ 7.50
 40.0 g. PEI _____ 10.90
 50.0 g. PEI _____ Viscous
 75.0 g. PEI _____ Highly viscous
100.0 g. PEI _____ Solid
125.0 g. PEI _____ Solid
150.0 g. PEI _____ Solid Viscosity minimum at 10 g./l. PEI.

It will be seen that the maximum reduction in quantity of PEI (as such) required to provide the viscosity minimum was already achieved with a mixture containing 68% of the PEI as acetate and 32% as free base as in series IIb and that no further reduction was attained with PEI 100% in the form of the acetate as in series IIIb.

FIG. 3 graphically illustrates the results of these tests (series Ib, IIb and IIIb).

EXAMPLE 4

(a) 65 g. of an aqueous 50% PEI paste were dissolved in 700 ml. of distilled water and 200 g. of the same mixed oxide asc employed in Example 3 mixed therewith with a propellor stirrer. Thereafter water was added to provide a volume of 1000 ml. and the mixture dispersed for 30 minutes with an Ultra-Turrax laboratory stirrer. The pH of the resulting dispersion measured with a glass electrode was 10.7. The viscosity thereof was determined periodically in the manner described in Example 1. The results are tubulated in the following:

After (days):               Viscosity in ° E.
  0 _____ 2.29
  7 _____ 2.30
 21 _____ 2.63
 28 _____ 2.91
 35 _____ Highly viscous (b) A colloidal solution was prepared as under (a) except that 29.2 ml. of 99–100% acetic acid were added to the 50% PEI paste in order to convert 68% of the PEI to its acetate. The viscosity of such colloidal solution prepared with 68% of the PEI in the form of its acetate and 32% in the form of the free base was again periodically determined. The results are tabulated in the following:

| After (days): | Viscosity in ° E. |
|---|---|
| 0 | 2.16 |
| 7 | 1.97 |
| 21 | 1.99 |
| 35 | 1.98 |
| 49 | 1.97 |
| 63 | 1.97 |
| 77 | 1.98 |
| 91 | 1.98 |
| 105 | 1.99 |

It will be seen that in contrast to the alkaline colloidal solution under (a) which already thickened to such an extent after 5 weeks' storage that it was useless, the colloidal solution produced with the acidified PEI under (b) can be stored for months wtihout substantial change in viscosity. It must be noted that the amount of PEI under (b) is three times the optimal quantity which would provide a colloidal solution with the minimum viscosity. The larger quantity was employed to provide a better basis for comparison with the colloidal solution under (a). The results obtained under (a) and (b) are graphically illustrated in FIG. 4.

We claim:

1. A process for the production of a colloidal solution of extremely finely divided oxide aerogel selected from the group consisting of pyrogenic aerogels of silica and pyrogenic mixed aerogels of silica and aluminum oxide, which comprises providing an aqueous solution of polyethylene imine, at least a portion of which is in the form of an acid addition salt thereof, and dispersing the finely divided oxide aerogel in dry form in said aqueous solution, the quantity, in grams per liter of the colloidal solution, of the polyethylene imine contained in said aqueous solution which represents the sum of the free and the acid bound base being less than ½ to ⅙ times X/200 times the BET surface area of the aerogel measured in square meters per gram, X being the concentration of the aerogel in the colloidal solution in grams per liter, the quantity of the polyethylene imine, within the range indicated being the less the greater the proportion of polyethylene imine salt to polyethylene imine base, and being such as to provide a colloidal solution which has a viscosity which is about the minimum viscosity for colloidal solutions containing said oxide aerogel and the polyethylene imine.

2. The process of claim 7 in which the finely divided oxide aerogel has a BET surface area of 30 to 150 m.²/g.

3. The process of claim 7 in which the proportion of polyethylene imine salt to polyethylene imine base is between 5:95 and 85:15.

4. The process of claim 7 in which the proportion of the polyethylene imine salt to polyethylene imine base is at least sufficient to prevent substantial increases in viscosity of the colloidal solution during at least one month's storage.

5. The process of claim 7 in which the acid addition salt of polyethylene imine is of a carboxylic acid selected from the group consisting of formic and acetic acids.

6. An aqueous colloidal solution of a finely divided oxide aerogel having a BET surface area of 30 to 150 m.²/g. selected from the group consisting of pyrogenic silica aerogel and pyrogenic mixed oxide aerogels of silica an daluminum oxide stabilized with polyethylene imine, at least a portion of which is in the form of an acid addition salt, the quantity of polyethylene imine being such as to provide a viscosity in the colloidal solution which is about the minimum viscosity for colloidal solutions containing the oxide aerogel and the polyethylene imine, such quantity, representing the sum of the free and the acid bound base, in grams per liter of colloidal solution being less than ½ to ⅙ times X/200 times the BET surface area of the oxide aerogel measured in square meters per gram, X being the concentration of the oxide aerogel in the colloidal solution in grams per liter, the quantity of the polyethylene imine being the less, within the range indicated, the greater the proportion of polyethylene imine salt to polyethylene imine base.

References Cited

UNITED STATES PATENTS

| 2,951,044 | 8/1960 | Wagner et al. | 252—313 |
| 2,982,665 | 5/1961 | Wilcox | 252—313 X |
| 2,984,629 | 5/1961 | Loftman et al. | 252—313 |
| 3,313,736 | 4/1967 | Dickson et al. | 252—357 X |

FOREIGN PATENTS 680,973  2/1964  Canada.

RICHARD D. LOVERING, Primary Examiner

U.S. Cl. X.R.

106—308; 252—313